Oct. 18, 1938.   M. FREUND   2,133,611
WIRE SPRING FOR CUSHIONED SEATS OF VEHICLES
Filed March 12, 1936   2 Sheets-Sheet 1
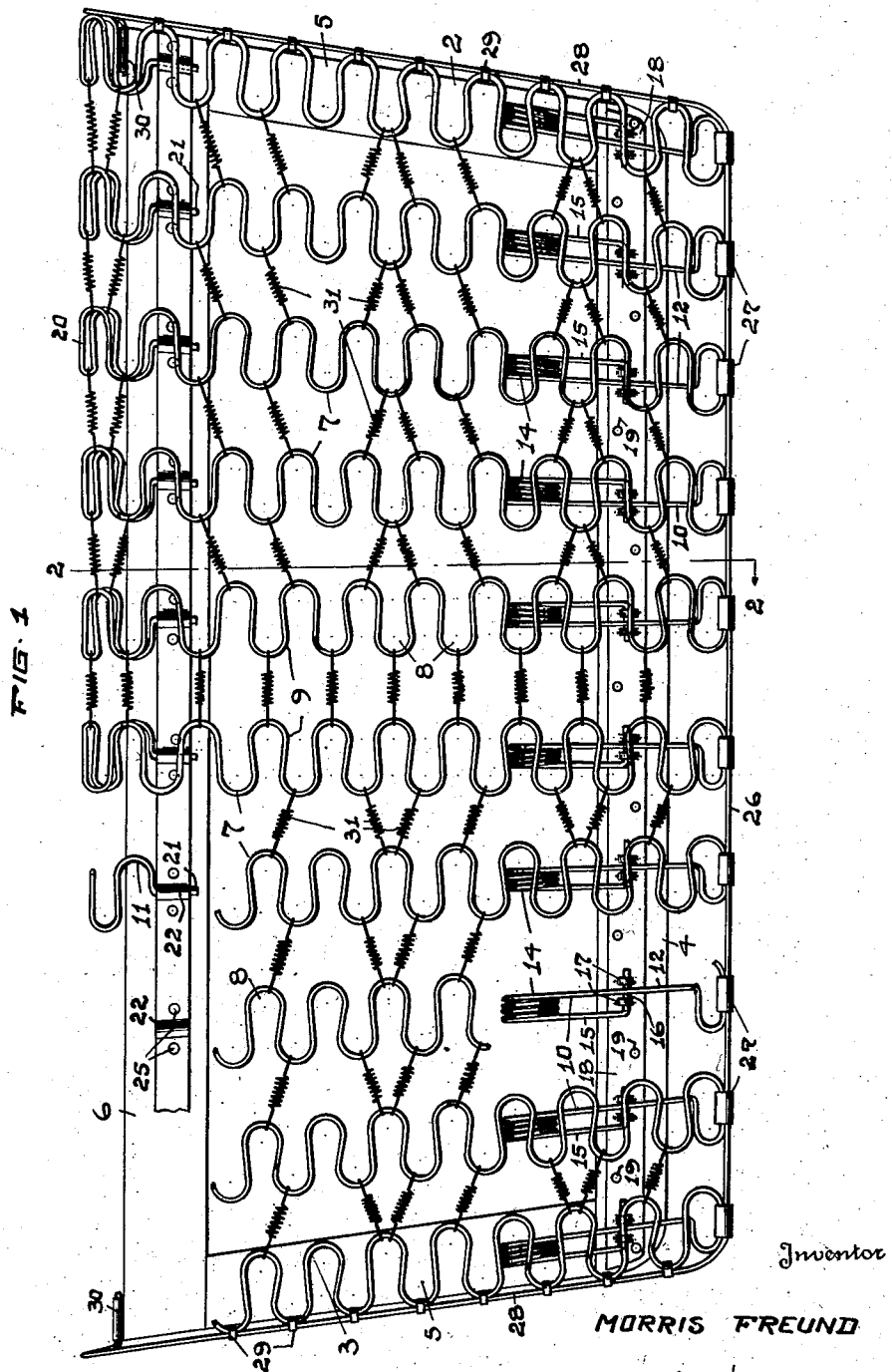
Inventor
MORRIS FREUND
By Gustav. A. Wolff
Attorney Oct. 18, 1938.   M. FREUND   2,133,611
WIRE SPRING FOR CUSHIONED SEATS OF VEHICLES
Filed March 12, 1936   2 Sheets-Sheet 2
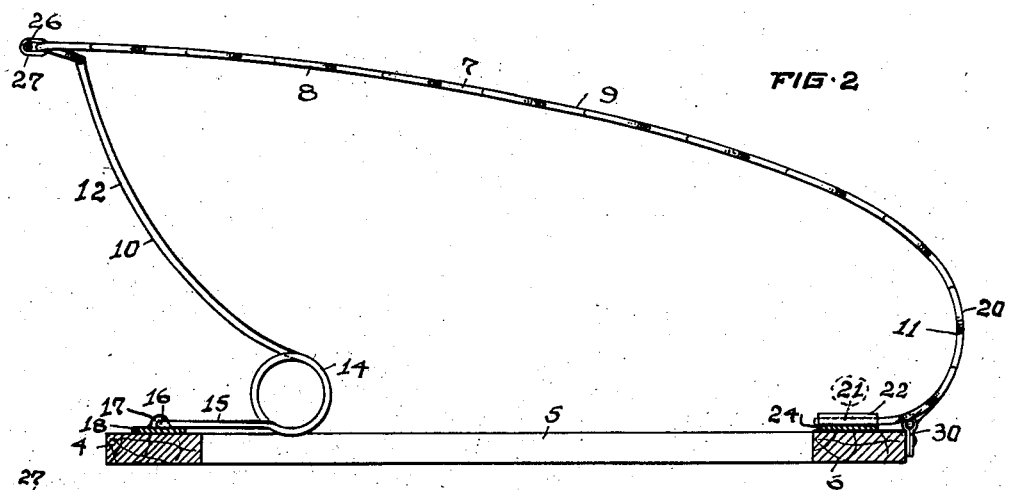
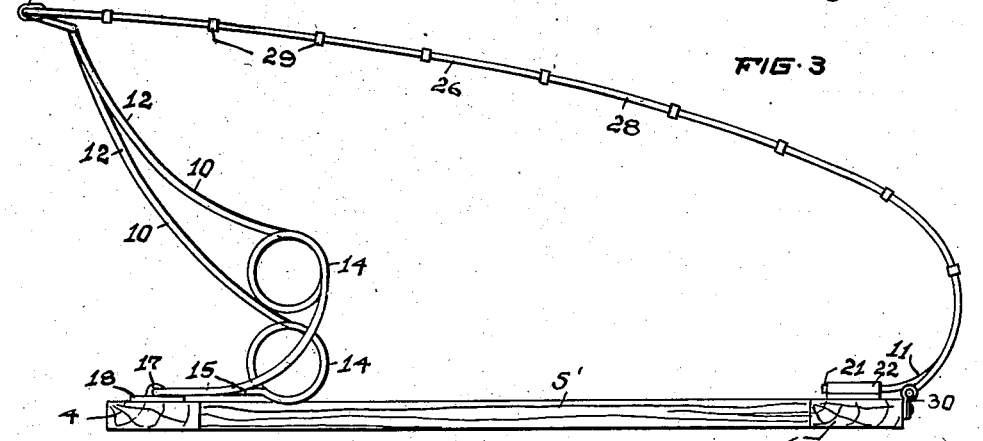
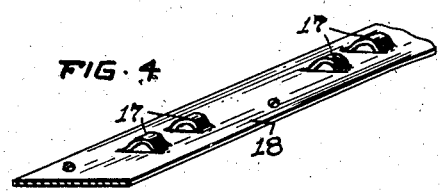
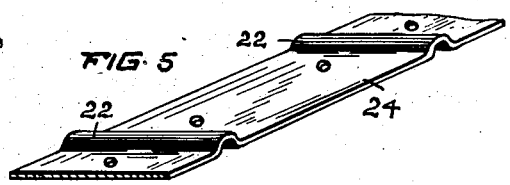
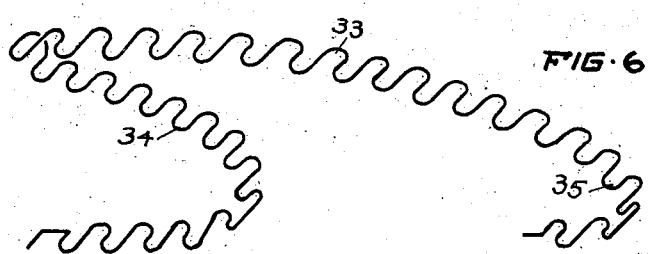
Inventor
MORRIS FREUND
By Gustav A. Wolff
Attorney Patented Oct. 18, 1938

2,133,611

UNITED STATES PATENT OFFICE 2,133,611

WIRE SPRING FOR CUSHIONED SEATS OF VEHICLES

Morris Freund, Cleveland, Ohio, assignor, by direct and mesne assignments, of one-half to Jacob Kronheim, Shaker Heights, Ohio, and one-half to John C. Lincoln, Scottsdale, Ariz.

Application March 12, 1936, Serial No. 68,417

4 Claims. (Cl. 155—179)

This invention relates to flat springs of sinuous or similar shape, used for seats of upholstered furniture, cushioned automobile seats, backs or the like, and more particularly to that type of springs described in my co-pending application Ser. No. 36,175 filed August 14, 1935, which became Patent 2,047,411 on July 14, 1936. Springs of the type referred to in the above application embody an upper, axially compressible and extensible seating portion, a yielding, rearwardly and downwardly extending supporting means at the front end of the seating portion, and a downwardly extending yielding supporting means at the rear end of the seating portion. The supporting means of the springs are either integrally formed with the seating portion or rigidly connected to the opposite ends of the seating portion so as to effect under load upward bulging and longitudinal stretching of the seating portion of the springs.

The flat springs are assembled to spring structures for seats of automobiles and upholstered furniture by attaching each spring individually to a frame, all as disclosed in the application referred to above, however, this method is slow and often results in loosening of springs when their individual attachment means have worked loose. To overcome this deficiency it has been proposed to assemble the springs in metal frames rigidly connected to the springs by means of rivets, as disclosed in my co-pending application Ser. No. 49,089, however, this method, when the springs have to be shipped, is unpractical, the space taken up by assembled products being rather large and increasing shipping cost.

The primary object of the present invention is the provision of a frame structure having a plurality of flat springs of the type referred to attached thereto and means for readily and easily connecting and disconnecting the springs individually to and from the frame, so as to permit of each spring attached to the frame structure being readily interchanged, mounted and dismounted.

Another object of the invention is the provision of a spring structure embodying flat springs having specific means at the ends of its supporting means cooperating with means secured to the frame of the spring structure to permit of each spring of the structure being readily interchanged, mounted and dismounted.

A further object of the invention is the provision of a spring structure embodying a supporting frame with specific attachment means rigidly secured thereto, and a plurality of flat springs shaped at the ends of their supporting means so as to slidably engage with and disengage from the attachment means of said frame and permit of each spring of the spring structure being readily interchanged, mounted and/or dismounted.

In addition, the invention has certain other marked superiorities which radically distinguish it from presently known structures.

The improvements or superior characteristics embodying certain novel features of construction are clearly set forth in the following specification and the appended claims; and a preferred form of embodiment of the invention is hereinafter shown with reference to the accompanying drawings forming part of the specification.

In the drawings:

Fig. 1 shows a spring structure of a cushioned seat embodying flat springs secured thereto according to the invention, some of the springs and the fastening means being partly broken away to more clearly disclose the attaching of the springs to the base.

Fig. 2 is an enlarged cross-sectional view through the spring structure shown in Fig. 1, the section being taken on line 2—2 of Fig. 1.

Fig. 3 is an enlarged side-view of the spring structure shown in Fig. 1 to more clearly disclose the pivotal attachment of the edge wire to the frame.

Fig. 4 is a fragmentary perspective view of the metal strip for pivotally securing the ends of the front supporting means of the springs to the front rail of the frame.

Fig. 5 is a fragmentary perspective view of the metal strip for securing the ends of the rear supporting means of the springs to the rear rail of the frame.

Fig. 6 is a perspective diagrammatical view of a modified form of a flat spring having the ends of its front and rear supporting means shaped for co-operation with the metal strips on the front and rear rail of the frame shown in Fig. 1.

Referring more particularly to the drawings, reference numeral 2 represents a frame of a spring structure 3 for an automobile seat. This frame embodies a front rail 4, two converging side rails 5, 5' and a rear rail 6, and supports a plurality of flat, sinuous springs 7 arranged crosswise of the frame 2 and secured to the front and rails 4 and 6 thereof. The springs 7, which are made of steel wire, bent to sinuous shape, so that the loops 8 of the springs extend substantially parallel to each other and form a seating portion 9 adapted to be longitudinally extended and/or compressed, are secured to the rails 4 and 6 by their supporting means 10 and 11 respectively. The front supporting portion 10 embodies a rearwardly and downwardly extending lever arm 12 integrally extended from the front end of the seating portion 9 and looped at its free end to provide a spring coil 14, arranged in a plane substantially rectangular to the plane of the seating portion 9. The free end 15 of coil 14 is extended forwardly of said coil and has its end portion 16 angularly bent to permit of the portion 16 being hinged to struck up ear portions 17 of a metal strip 18, which strip is rigidly secured to the front rail 4 by means of nails 19 and thus secures all front supporting portions 10 of the springs 7 to the front rail 4 of the frame 3. The rear supporting portions 11 of springs 7 are also integrally formed with the seating portion 9. Thus the sinuous-shaped wire of the portion 9 is extended beyond the rear end of said seating portion 9 and bent on a curve downwardly and forwardly to form a substantially semi-circular yielding wire supporting member 20. This supporting member extends at its free end into a straight finger portion 21 adapted to be sleeved into struck up channels 22 of a metal strip 24, which strip in turn is securely attached to the rear rail 6 by means of nails 25. It will now be seen that the two supporting portions 10 and 11 of each spring 7 securely attach the spring to the respective rails 4 and 6 of the frame 3 and that each spring may readily, easily and independently be mounted and/or dismounted as the case may be.

The springs 7, thus secured to the frame 3, support at the front ends of their seating portions the front portion of a substantially U-shaped edge wire 26, which wire is pivotally secured to said springs by means of clips 27. The side portions 28 of this edge wire are shiftably interlocked with the coils 8 of the two outer springs 7, small clips 29 being used for this purpose, and the edge wire itself is pivotally engaged with the rear rail 6 of the frame 3 by means of brackets 30, an arrangement which permits of more distinct and individual stretching and bulging of the separate springs under load.

A plurality of short helical springs 31 yieldingly interconnect the seating portions 9 of the springs, and these helical springs are symmetrically arranged so as to effect proper equal distribution of tension over all parts of the finished spring structure, which can readily be padded and covered with cloth or the like, all as customary in the art.

In the modified form of spring shown in Fig. 6 the spring is formed from a continuous sinuous-shaped wire, so that the seating portion 33 and the two supporting portions 34, 35 respectively all embody flat surfaces. It should be noted that in this construction the front supporting portion 34 does not show a coiled portion, as the length of the sinuous-shaped wire is ordinarily sufficient to obtain the necessary yield at the front end of the spring, however, if desired, the front supporting portion may readily be coiled as proposed in the structure shown in my co-pending application Ser. No. 49,089 filed November 9, 1935.

Having thus described my invention, what I claim is:

1. A spring for cushioned seats or the like comprising a horizontally corrugated seating portion, an integral rearwardly and downwardly extended front supporting portion, and an integral corrugated curved rear supporting portion including an upper rearwardly and downwardly extended portion shorter in length than said front supporting portion, said rear supporting portion being formed by curving the rear end of said corrugated seating portion downwardly.

2. A spring for cushioned seats or the like as described in claim 1, wherein the spring is formed from a continuous steel wire bent to a horizontally corrugated, flat structure shaped at one end to form the said resilient, corrugated, yielding front supporting means and curved at its rear end to form a substantially semi-circular corrugated rear supporting means, wherein the wire at the end of said front supporting means is offset at a right angle to said supporting means to permit of a hinge connection of the front supporting means with a furniture frame and wherein the wire at the end of the rear supporting means forms a straight finger portion axially aligned with said portion adapted to be slidably connected with a furniture frame.

3. As an article of manufacture and sale a cushioned seat for automobiles, upholstered furniture and the like comprising a frame, attachment means on the front and rear rails of said frame, a plurality of springs such as described in claim 1 hinged with the connecting means at the front supporting means to the attachment means on the front rail and secured with the connecting means at the rear supporting means to the attachment means on the rear rail, and a U-shaped edge wire pivotally secured to the front ends of the seating portion and slidably engaged with the outer sides of the two outer springs, said edge wire being hinged to the rear rail of said frame to permit of axial stretching of the seating portions of said springs under load.

4. A wire spring for cushioned seats or the like comprising a corrugated wire bent to form an upper, substantially horizontal seating portion, a relatively long, rearwardly and downwardly extending front supporting arm for said portion, and a shorter, rearwardly and downwardly extending rear supporting arm for said portion, said arms being adapted to support said seating portion in elevated position and the differential length of said arms effecting stretching of said portion, when said seating portion is moved downwardly by a load placed thereon.

MORRIS FREUND.